(12) United States Patent
Hackl

(10) Patent No.: US 12,553,930 B2
(45) Date of Patent: Feb. 17, 2026

(54) METHOD AND INSULATION MONITORING ARRANGEMENT FOR A FUNCTIONALLY GROUNDED ELECTRIC INSTALLATION OPERATED USING A SUPPLY DIRECT VOLTAGE

(71) Applicant: Bender GmbH & Co. KG, Gruenberg (DE)

(72) Inventor: Dieter Hackl, Fernwald (DE)

(73) Assignee: Bender GmbH & Co. KG, Gruenberg (DE)

( * ) Notice: Subject to any disclaimer, the term of this patent is extended or adjusted under 35 U.S.C. 154(b) by 0 days.

(21) Appl. No.: 18/959,086

(22) Filed: Nov. 25, 2024

(65) Prior Publication Data

US 2025/0172595 A1    May 29, 2025

(30) Foreign Application Priority Data

Nov. 24, 2023   (DE) ...................... 10 2023 132 796.8

(51) Int. Cl.
   *G01R 27/02* (2006.01)
   *G01R 27/08* (2006.01)
(52) U.S. Cl.
   CPC ........... *G01R 27/025* (2013.01); *G01R 27/08* (2013.01)
(58) Field of Classification Search
   CPC ........ G01R 27/00; G01N 27/04; G01N 27/02; G01N 17/00; G01L 1/22; G01L 1/20; G01L 1/10
   See application file for complete search history.

(56) References Cited

U.S. PATENT DOCUMENTS

| | | | |
|---|---|---|---|
| 6,169,680 B1 * | 1/2001 | Matsui | H02M 3/33515 363/21.05 |
| 6,271,655 B1 * | 8/2001 | Weber | G01R 15/18 361/93.6 |

FOREIGN PATENT DOCUMENTS

| | | |
|---|---|---|
| CN | 108 572 278 A | 9/2018 |
| CN | 116 298 522 A | 6/2023 |
| DE | 102011084219 A1 | 4/2013 |
| DE | 102016110455 A1 | 12/2016 |
| DE | 102020121593 A1 | 2/2022 |

* cited by examiner

*Primary Examiner* — Tung X Nguyen
(74) *Attorney, Agent, or Firm* — Dickinson Wright PLLC; Andrew D. Dorisio

(57) ABSTRACT

A method and insulation monitoring arrangement for insulation monitoring of an electric installation operated using a supply direct voltage and has a first insulation resistance between the positive active conductor and ground and a second insulation resistance between the negative active conductor and ground as well as a functional grounding between the negative active conductor and ground by a ground resistance. The method involves measuring a ground current, which flows in the path of the functional grounding, by means of a DC measuring device; measuring the supply direct voltage by means of a voltage measuring device; computing the first insulation resistance from the supply direct voltage divided by the ground current by means of a computing unit; the condition is valid during operation of the electric installation that the second insulation resistance being at least 100 times greater than the ground resistance.

14 Claims, 7 Drawing Sheets

State of the Art

State of the Art

METHOD AND INSULATION MONITORING ARRANGEMENT FOR A FUNCTIONALLY GROUNDED ELECTRIC INSTALLATION OPERATED USING A SUPPLY DIRECT VOLTAGE

This application claims priority to German Patent Application No. 10 2023 132 796.8 filed on Nov. 24, 2024, the disclosure of which is hereby incorporated by reference.

TECHNICAL FIELD

The invention relates to a method for insulation monitoring of an electric installation which is operated using a supply direct voltage and has a first insulation resistance between the positive active conductor and ground and a second insulation resistance between the negative active conductor and ground as well as a functional grounding between the negative active conductor and ground by means of a ground resistance (path of the functional grounding).

BACKGROUND

Furthermore, the invention relates to an insulation monitoring arrangement implementing the method according to the invention.

When higher requirements to the operational, fire and touch safety of electric installations need to be fulfilled, the network form of an ungrounded power supply system is used, which is also referred to as an insulated network (French: isolé terre-IT) or as an IT power supply system. In this type of power supply system, the active parts of the ground potential—to ground—are insulated. The advantage of these networks is that the function of the connected electrical consumers is not impeded when an insulation fault is present, as a current circuit cannot become closed because of the ideally infinitely large insulation resistance value between an active conductor of the network and ground. Operation of the network can therefore be continued when a first insulation fault occurs.

The resistance of the ungrounded power supply system to ground (insulation resistance, or an insulation fault resistance or fault resistance in the event of a fault) must therefore be continuously monitored, as another possible fault at a different active conductor could cause a fault loop and the flowing residual current in conjunction with an overcurrent protective device could result in a shutdown of the installation with an operational standstill.

In particular in electric installations, which are supplied by an ungrounded AC power supply system and are operated by an AC/DC rectifier using a supply direct voltage, the risk exists of DC stray currents crossing over to electrolytically conductive installation foundations via metallically conductive installation parts insulation resistance paths. Thus, unprotected metallic components, which are located in an electrolytic environment, such as steel reinforcements in a concrete foundation or underground metallic devices, are exposed to corrosion by DC stray currents from power supply installations. In buildings made of reinforced concrete, the material wear occurring at the reinforcing steel can result in a weakening of the statics or cause leaks in underground pipes.

In particular, this also applies to hydrogen electrolysis installations, in which electrolytically conductive current paths can cause stray currents in the electrolytic underground via a process-water connection of the electrolyzer or a parasitic, electrolytically conductive current path, the stray currents reducing the service life of the electric installation as a result of the DC nominal voltage at the electrolyzer and as a result of the magnitude of the (electrolytic) insulation resistance paths.

With regard to limiting the DC stray currents and the connected dangers via electric corrosion, particular importance is attached to insulation monitoring.

With hydrogen electrolysis installations, many manufacturers are able to design the electric installation such that the parasitic electrolytic current paths come into contact with ground at a high impedance level. In this context, insulation resistance values which are significantly greater than 100Ω/V DC nominal voltage can be achieved.

The DC stray currents occurring at this level are uncritical in most cases and do not lead to a reduced service life of the installation.

Where this is not achievable due to construction, the manufacturers of the installations instead connect the negative active conductor (negative pole) to the ground potential at a low impedance level on the DC side of the electric installation by means of a grounding resistance. This functional grounding does not change the possible (electrolytic) current flow via the first insulation resistance between the positive active conductor and ground; however, a portion of this current now no longer flows via the second insulation resistance located between the negative active conductor and ground but via the ground resistance of the functional grounding switched parallel to the second insulation resistance.

Efforts are made to configure the metallic current path via the ground resistance to be as low in impedance as possible so that the remaining possible DC stray current portion via the second insulation resistance does not lead to a reduced service life of the electric installation due to electric corrosion.

However, determining the insulation resistance in conjunction with the functional grounding poses a problem for the operators of the installation, since a low-impedance connection between the negative active conductor of the electric installation and ground exists because of this functional grounding.

Attempts are well known where the insulation state of the electric installation is estimated via a DC measurement or via a DC residual current measurement on the AC side of the converter. However, since load currents in the kA range can sometimes occur, in particular in hydrogen electrolyzers, this DC measurement or DC residual current measurement on the AC side cannot be implemented with the required precision according to the state of the art in order to be able to determine undesired residual currents below the range of several hundred mA.

According to the state of the art, it is also possible for the functional grounding to take place via what is known as a GFDI (ground-fault detector interrupter) which insulates the functional grounding for a short period of time in specific time intervals, e.g., daily before operation of the electric installation is commenced, in order to be able to implement insulation monitoring. A disadvantage of this solution is the required sufficiently high-impedance isolator of the GFDI which has to be configured to endure the full DC nominal voltage. Furthermore, it is disadvantageous that insulations cannot be monitored mostly without interruption for the entire operational cycle of the electric installation.

Another common approach is to realize the functional grounding via a monitored resistance grounding of the negative active conductor to ground. In this case, the NGR (neutral ground resistor) monitoring approach common to the US market is used. A disadvantage of this approach is, however, that the NGR requires its own control cabinet depending on the expected absorbed power of the electric installation and that the voltage drop is greater than the NGR in a range (>1 V DC) in which the stray current corrosion cannot be prevented depending on the magnitude of the stray current and the resistance value.

SUMMARY

The object of the invention at hand is therefore to develop a method and an arrangement implementing this method which both allow reliable insulation monitoring for an electric installation operated using a supply direct voltage and having a functional grounding.

With respect to a method, the object is attained by measuring a ground current, which flows in the path of the functional grounding, by means of a DC measuring device; by measuring the supply direct voltage by means of a voltage measuring device; by computing the first insulation resistance from the supply direct voltage divided by the ground current by means of a computing unit; the condition being valid during operation of the electric installation that the second insulation resistance is at least 100 times greater than the ground resistance.

The fundamental idea of the invention at hand is based on installing a (highly sensitive; see below) DC measuring device, which detects the ground current flowing via the ground resistance, in the path of the functional grounding and on simultaneously measuring the supply direct voltage by means of a voltage measuring device.

The first insulation resistance is computed by dividing the supply direct voltage by the ground current in a computing unit.

Generally, the as precise as possible determination of only the first insulation resistance is of interest, as the by far largest portion of the stray current flows via the low-impedance ground resistance—and not via the parallel second insulation resistance—owing to the functional grounding parallel to the second insulation resistance. Conditions are tied to the second insulation resistance merely regarding the proportions to the ground resistance.

With regard to preventing electric corrosion, it is important that the DC voltage between the negative active conductor and ground, i.e., the DC voltage drop via the ground resistance, is so small that no corrosion processes can commence at the possible location for electric corrosion, namely the path via the second insulation resistance—an electrolytically conductive current path via a process water connection of the electrolyzer in the case of the hydrogen electrolysis installation. Experience has shown that this is ensured when this DC voltage drop is significantly below 1 V (DC).

Simulation results show that insulation monitoring with determining the first insulation resistance takes place in a sufficiently precise manner when the condition is valid during operation of the electric installation that the second insulation resistance is at least 100 times greater than the ground resistance.

In another embodiment, an antiparallel diode circuit having a bypass switch switched parallel to the antiparallel diode circuit is disposed in series to the ground resistance in the path of the functional grounding, the bypass switch cyclically alternating between a high-impedance open state and a low-impedance closed state, a diode voltage being measured by means of another voltage measuring device (via the antiparallel diode circuit), the first insulation resistance being computed in the closed state from the supply direct voltage divided by the ground current, and the second insulation resistance being computed by dividing a diode voltage change between the two states and a ground current change between the two states by means of a computing unit.

Since the manufacturers of functionally grounded electric installations often cannot assess whether the condition for a sufficiently precise insulation monitoring, i.e., the second insulation being at least 100 times greater than the ground resistance, can be maintained from an operational viewpoint and thus the realized functional grounding is actually protected against electric corrosion from DC stray currents, the second insulation resistance is computed for verifying this condition.

For this purpose, a combination of diodes switched in an antiparallel manner and having a parallel bypass switch is inserted in series to the ground resistance in the path of the functional grounding on the DC side of the functionally grounded electric installation. The DC decoupling by means of the antiparallel diode circuit prevents high cut-off voltages, which could destroy parallel components, from occurring in only one diode.

Both the diodes and the bypass switch are to be configured for the expected maximum ground current. The DC voltage (diode voltage) dropping via the antiparallel diode circuit is measured.

The bypass switch is preferably realized by a very low-impedance semiconductor switch. In this context, the magnitude of the resistance in the running state of the bypass switch should maximally be in the range of the ground resistance.

The bypass switch is now controlled such that it cyclically alternates between a high-impedance open and a low-impedance closed state. The dwell times for the open/closed state are chosen such in this context that the measured variables ground current, ground current change, diode voltage, diode voltage change and supply direct voltage can be detected sufficiently precisely.

During the closed state of the bypass switch, during which the diode circuit is short-circuited, the first insulation resistance is computed from the supply direct voltage divided by the ground current.

Additionally, after a period each in the open and closed state of the bypass switch, the diode voltage change between the two states and the ground current change between the two states are detected and used to compute the second insulation resistance from quotient of the diode voltage change and the ground voltage change.

Alternatively to the embodiment described above with an antiparallel diode circuit and bypass switch, an antiparallel diode circuit without a bypass switch switched parallel is inserted in series to the ground resistance in the path of the functional grounding in another embodiment, the first insulation resistance being computed from the supply direct voltage divided by the ground current by means of the computing unit.

Simulation results show that even without determining the second insulation resistance, the condition that the second insulation resistance is at least 100 times greater than the ground resistance is still sufficiently fulfilled when the DC voltage drop via the antiparallel diode circuit is significantly above one percent of the diode let-through current.

From this, it can be derived that the bypass switch can be foregone and the diode voltage dropping via the antiparallel diode circuit can be used such that this diode voltage is monitored as a consequence that the measured voltage value is significantly above one percent of the diode let-through current.

In this case, it is assumed the first insulation resistance is computed sufficiently precisely from the supply direct voltage divided by the ground current.

Advantageously, the ground current measured by means of the DC measuring device is detected in a range of less than 100 mA.

The DC measuring device is to be configured such that the ground current can be detected in the mA range below 100 mA using highly sensitive measuring technology during regular operation of the electric installation.

Furthermore, a DC residual current is detected by means of DC residual-current measuring device installed in the path of the functional grounding.

Additionally, a supplemental fault protection can be executed in all embodiments in order to trigger a quick shutdown of the electric installation when a DC residual current dangerous to persons or the installation occurs in the functional path. For this purpose, a DC residual-current measuring device is installed in the path of the functional grounding.

In contrast to the highly sensitive DC measuring device for measuring the ground current, the DC residual-current measuring device is to be configured for detecting the DC residual current for the significantly higher residual current occurring in the event of a fault (ground fault).

Without this additional fault protection, the functional-ground path would have to have an extremely low-impedance loop impedance in order to quickly and reliably trigger a present overcurrent protective device. For this purpose, all elements in the functional-ground path would have to be configured for such high currents, ranging from several 100 A to the kA range.

By means of this additional fault protection, however, a quick and reliable shutdown of the electric installation can be effected with significantly smaller residual currents in the one-digit ampere range.

The components in the path of the functional ground can be sized smaller and are thus made available more inexpensively and easily.

Preferably, the DC residual current is detected by means of a DC residual-current measuring device configured as a modular residual current device.

The design of the DC residual-current measuring device as a (DC-sensitive) modular residual current device (MRCD) allows premature detection of impending residual currents via the DC-sensitive residual current monitoring integrated in the MRCD and to effect a shutdown of the electric installation within a normatively prescribed period of time in conjunction with an external switching element.

The method for insulation monitoring according to the invention has proven particularly advantageous when the electric installation operated using supply direct voltage is a hydrogen electrolysis installation.

With regenerative energies as the foundation of hydrogen production on the rise, the method according to the invention can be used very efficiently in conjunction with the operation of hydrogen electrolysis installations, as special challenges are posed to the monitoring of the insulation resistance because of the electrolytically conductive process-water pipe system.

The claimed structural features of the insulation monitoring arrangement according to the invention implement the corresponding method steps of the method for insulation monitoring according to the invention. Thus, the technical effects attained with the method and the resulting advantages pertain equally to the insulation monitoring arrangement.

BRIEF DESCRIPTION OF THE DRAWINGS

Further advantageous embodiment features are derived from the following description and drawings, which describe a preferred embodiment of the invention by means of examples.

DETAILED DESCRIPTION

Figure 1:
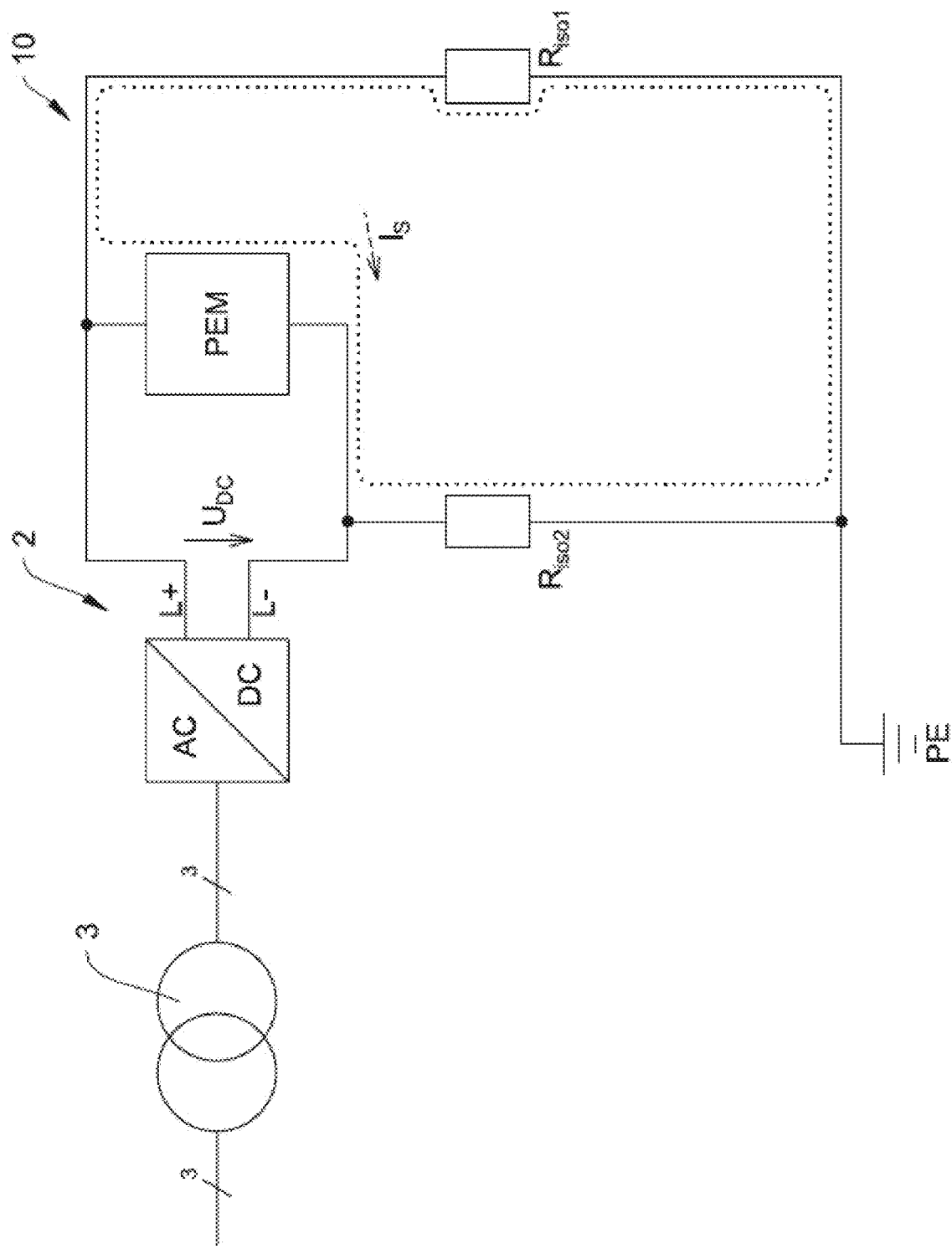
FIG. 1 shows the development of electric corrosion via a DC stray current in a hydrogen electrolysis installation.

FIG. 1 shows the development of electric corrosion via a DC stray current $I_S$ in an electric installation 2 using the example of a hydrogen electrolysis installation 2 having a PEM (proton exchange membrane) electrolyzer.

The PEM electrolyzer is fed by a three-phase alternating current network 3 and is connected to the positive active conductor $L_+$ and the negative active conductor $L_-$ via an AC/DC rectifier. Between positive active conductor $L_+$ and ground PE, the insulation state of hydrogen electrolysis installation 2 is characterized by a first insulation resistance $R_{iso1}$; accordingly, a second insulation resistance $R_{iso2}$ is shown between negative active conductor $L_-$ and ground PE. Insulation resistances $R_{iso1}$ and $R_{iso2}$ can thus form an electrically conductive current path via the process-water connection of the PEM electrolyzer and a parasitic current path of metallically conductive parts and an electrolically conductive foundation (for example a concrete foundation).

A DC stray current $I_S$ flows in this current circuit, DC stray current $I_S$ being able to cause electric corrosion in the electrolytically conductive (concrete) foundation.

Figure 2:
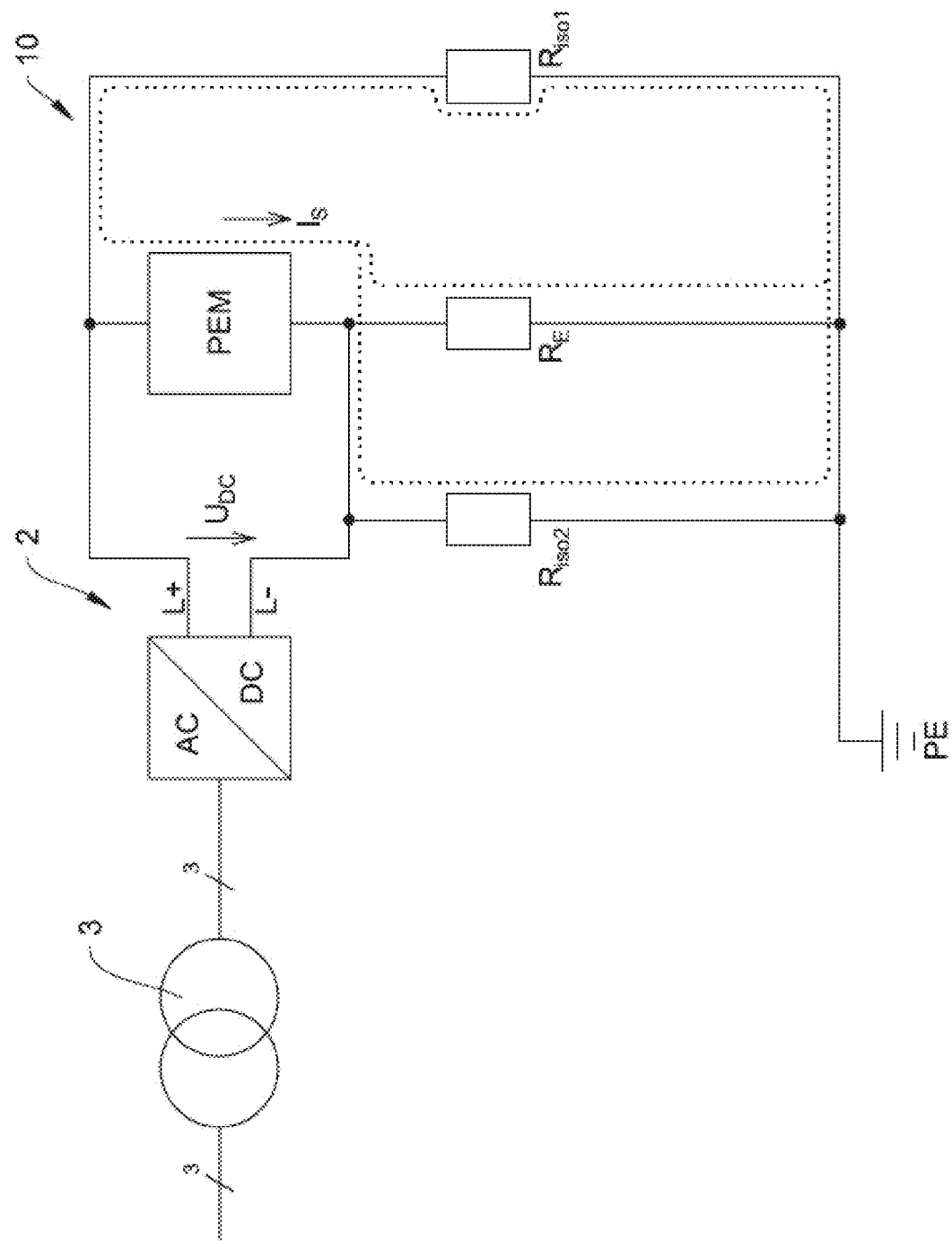
FIG. 2 shows the hydrogen electrolysis installation with a functional grounding.

FIG. 2 shows hydrogen electrolysis installation 2 having a functional grounding via a ground resistance $R_E$.

Negative active conductor $L_-$ is connected to ground PE via ground resistance $R_E$. Since this ground resistance $R_E$ is configured to be many times lower in impedance than insulation resistance $R_{iso2}$ switched parallel, the majority of stray current $I_S$ flows as a ground current $I_E$ via the path of the functional grounding. As a result, the risk of corrosion is significantly lower there via second insulation resistance $R_{iso2}$ because of the now reduced stray current portion.

Figure 3:
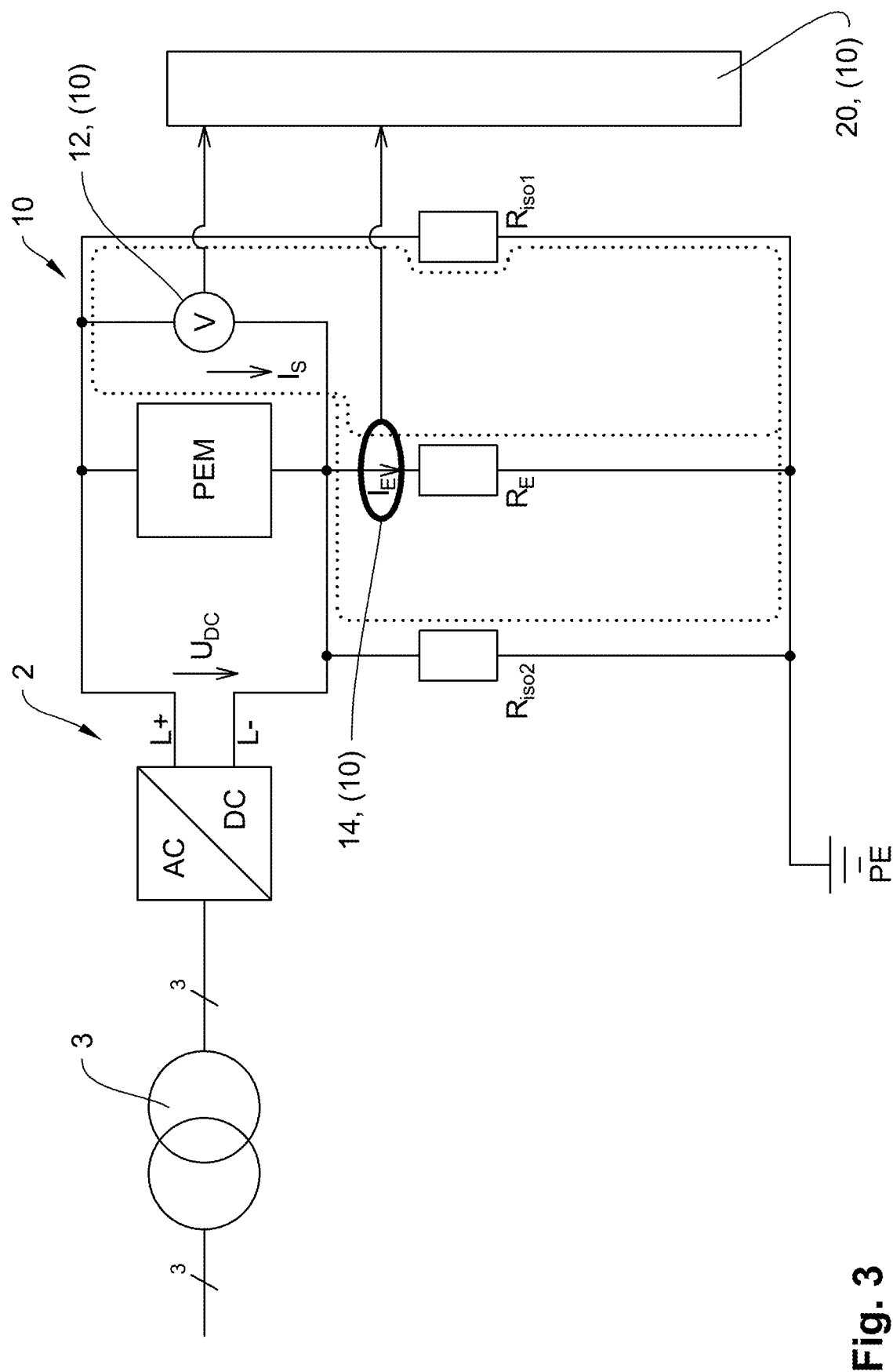
FIG. 3 shows an insulation monitoring arrangement according to the invention for the functionally grounded hydrogen electrolysis installation.

FIG. 3 shows an insulation monitoring arrangement 10 according to the invention for functionally grounded hydrogen electrolysis installation 2.

For this purpose, a DC measuring device 14 is provided in the path of the functional grounding, DC measuring device 14 detecting ground current $I_E$ flowing via ground resistance $R_E$. To measure supply direct voltage $U_{DC}$, a voltage measuring device 12 is located between positive active conductor $L_+$ and negative active conductor $L_-$. First insulation resistance $R_{iso1}$ is computed in a computing unit 20. According to Ohm's Law, the division of supply direct voltage $U_{DC}$ by ground current $I_E$ equals the first insulation resistance $$R_{iso1} = \frac{U_{DC}}{I_E}$$

Insulation monitoring arrangement 10 according to the invention consequently comprises voltage measuring device 12, DC measuring device 14 and computing unit 20 as the main components in order to evaluate the measured variables and for computing first (and second) insulation resistance $R_{iso1}$ ($R_{iso2}$).

During operation of hydrogen electrolysis installation 2, the condition is to be maintained that second insulation resistance $R_{iso2}$ is at least 100 times greater than ground resistance $R_E$ so that the possibly corrosive stray current portion via second insulation resistance $R_{iso2}$ is low.

Figure 4:
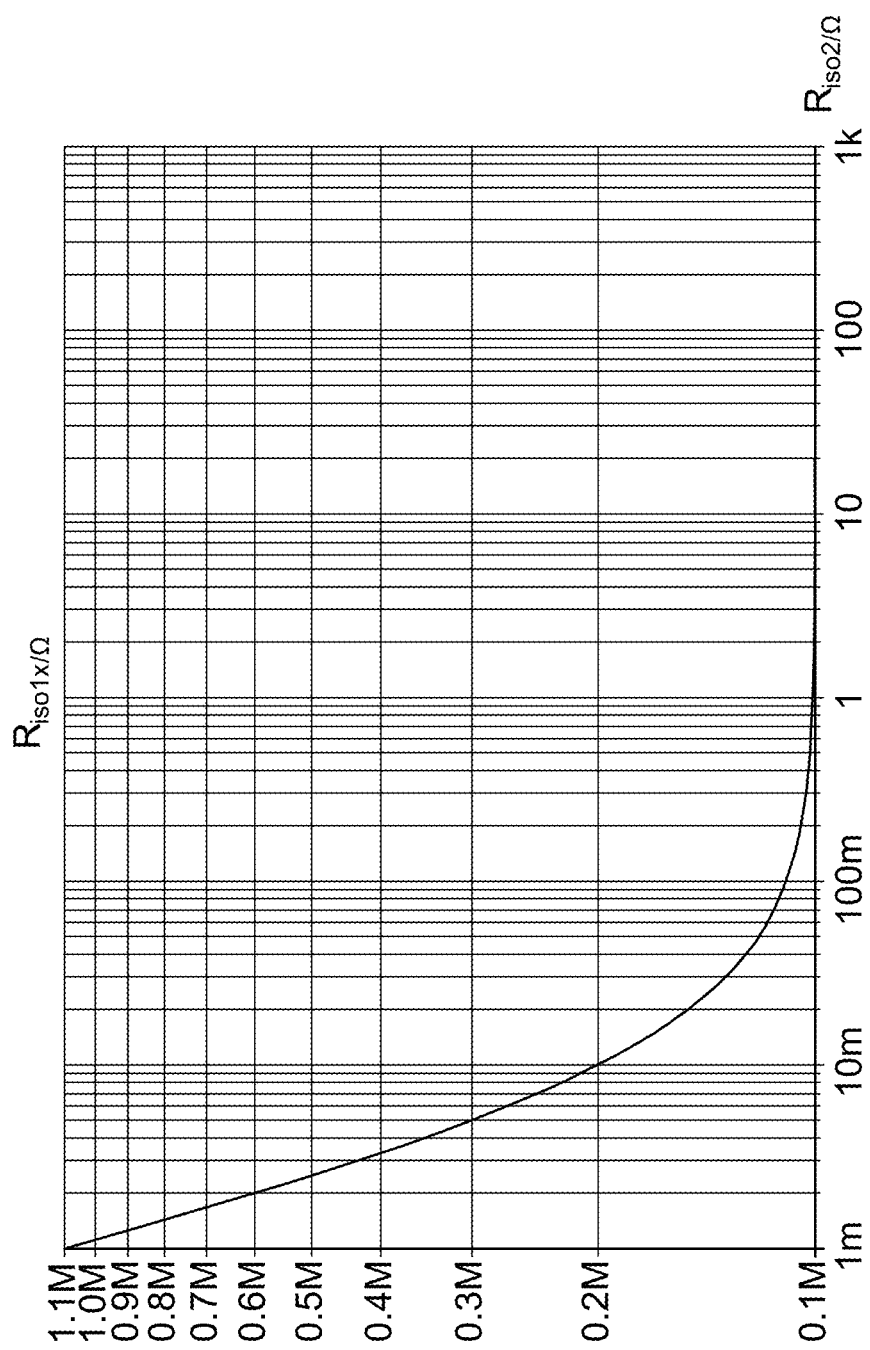
FIG. 4 shows simulation results of the computed first insulation resistance as a function of the second insulation resistance.

FIG. 4 shows a simulation result of computed first insulation resistance $R_{iso1}$ as a function of second insulation resistance $R_{iso2}$.

In practice, many manufacturers of functionally grounded hydrogen electrolysis installations 2 find it difficult to assess whether the condition that second insulation resistance $R_{iso2}$ is many times greater than ground resistance $R_E$ is fulfilled and thus whether the realized functional grounding actually protects from electric corrosion caused by a DC stray current $I_S$.

To verify this condition, second insulation resistance $R_{iso2}$ ranging from 10 mΩ to 1 kΩ is changed step by step in the simulation using a constant first insulation resistance $R_{iso1}$ of 100 kΩ and a constant ground resistance $R_E$ of 10 mΩ and the respective value of first insulation resistance $R_{iso1}$ is computed from DC nominal voltage $U_{DC}$ and ground current $I_E$ as computed above.

FIG. 4 shows that the desired value of 100 kΩ of first insulation resistance $R_{iso1}$ is reached at a second insulation resistance value of $R_{iso2}$=1Ω. The condition can thus be that second insulation resistance $R_{iso2}$ (=1Ω) should be 100 times greater than ground resistance $R_E$ (=10 mΩ).

Figure 5:
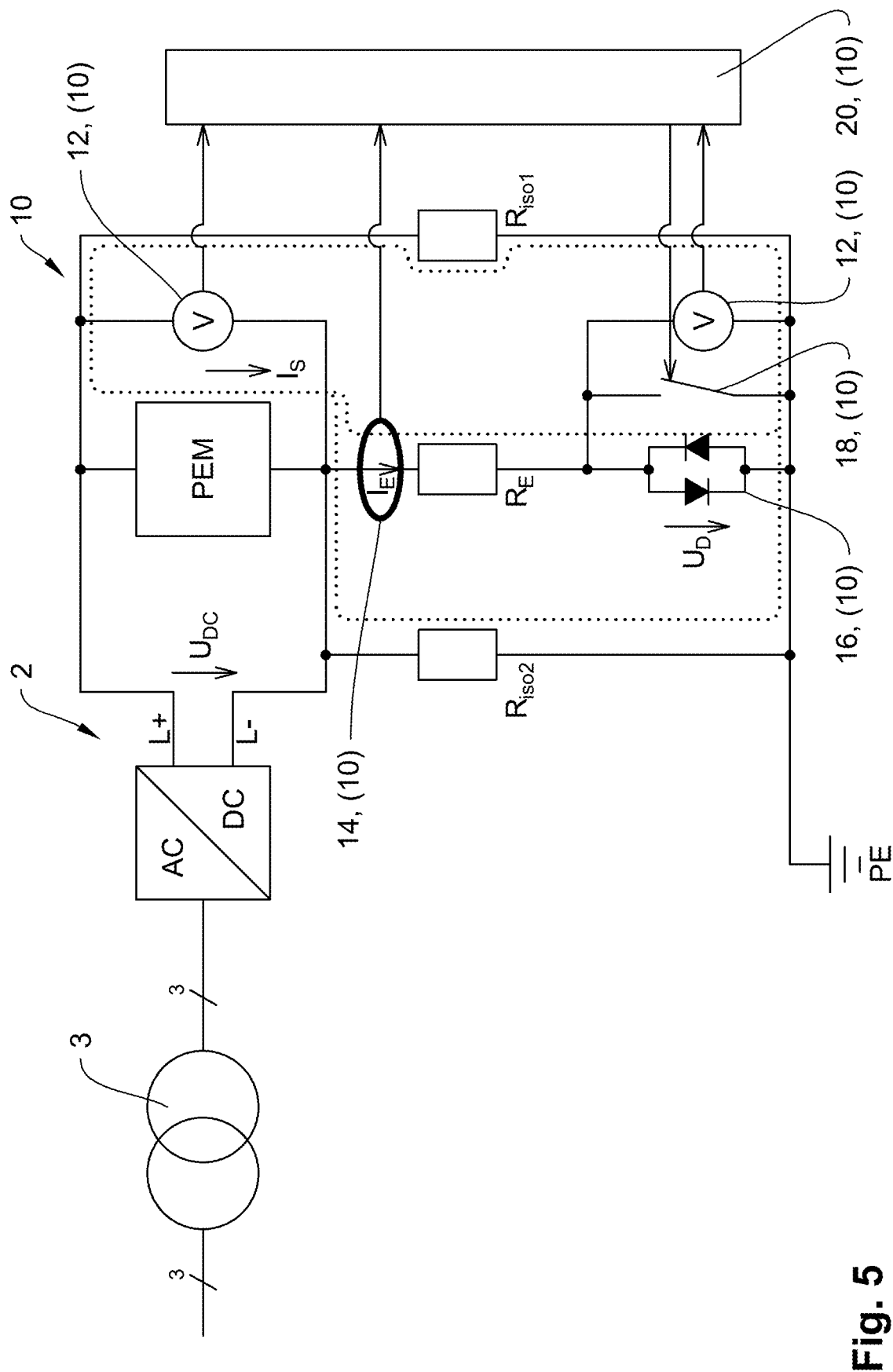
FIG. 5 shows an insulation monitoring arrangement according to the invention and having an antiparallel diode circuit and bypass switch.

FIG. 5 shows an insulation monitoring arrangement 10 according to the invention and having an antiparallel diode circuit 16 and a bypass circuit 18.

In this exemplary embodiment, insulation monitoring arrangement 10 according to the invention additionally comprises antiparallel diode circuit 16 having another voltage measuring device 12 and bypass circuit 18. In this context, antiparallel diode circuit 16 switched in series to ground resistance $R_E$ in the path of the functional grounding and bypass switch 18 is disposed parallel to antiparallel diode circuit 16. Bypass switch 18 is cyclically switched between a high-impedance open state and a low-impedance closed state via control signals originating from computing unit 20.

In the closed state of bypass switch 20, diode circuit 16 is short-circuited, meaning first insulation resistance $R_{iso1}$ is yielded from supply direct voltage $U_{DC}$ is divided by ground current $I_E$ at a low-impedance ground resistance $R_E$, as described above.

Second insulation resistance $R_{iso2}$ is computed by dividing voltage change $\Delta U_D$ between the two states and the voltage change $\Delta I_E$ between the two states $$R_{iso2} = \frac{\Delta U_D}{\Delta I_E}$$

Figure 6:
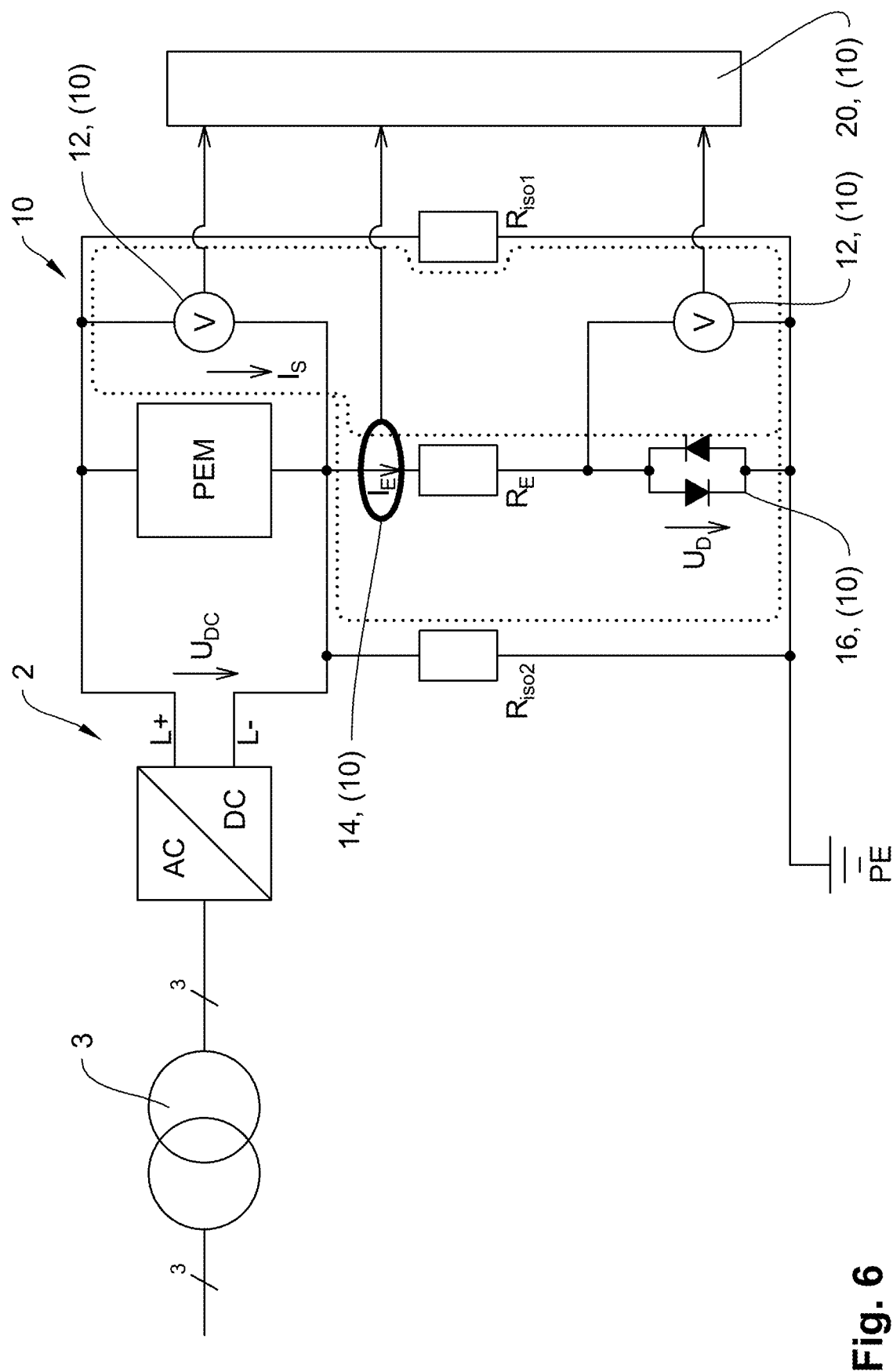
FIG. 6 shows an insulation monitoring arrangement according to the invention and having an antiparallel diode circuit without a bypass switch.

FIG. 6 shows another embodiment of an insulation monitoring 10 according to the invention and having an antiparallel diode circuit 16 without a bypass switch 18.

Simulation results show that even without determining second insulation resistance $R_{iso2}$, it can be assumed that the condition that second insulation resistance $R_{iso2}$ should be 100 times greater than ground resistance $R_E$ is fulfilled when DC voltage drop Up via antiparallel diode circuit 16 is significantly above one percent of the diode let-through voltage. In this case, bypass switch 18 can be foregone in this optimized embodiment and DC voltage drop Up via antiparallel diode circuit 16 is monitored to discover that this voltage value is still significantly above one percent of the diode let-through voltage.

In this case, it is presumed that first insulation resistance $R_{iso1}$ is computed sufficiently precisely by dividing DC nominal voltage $U_{DC}$ by ground voltage $I_E$.

Figure 7:
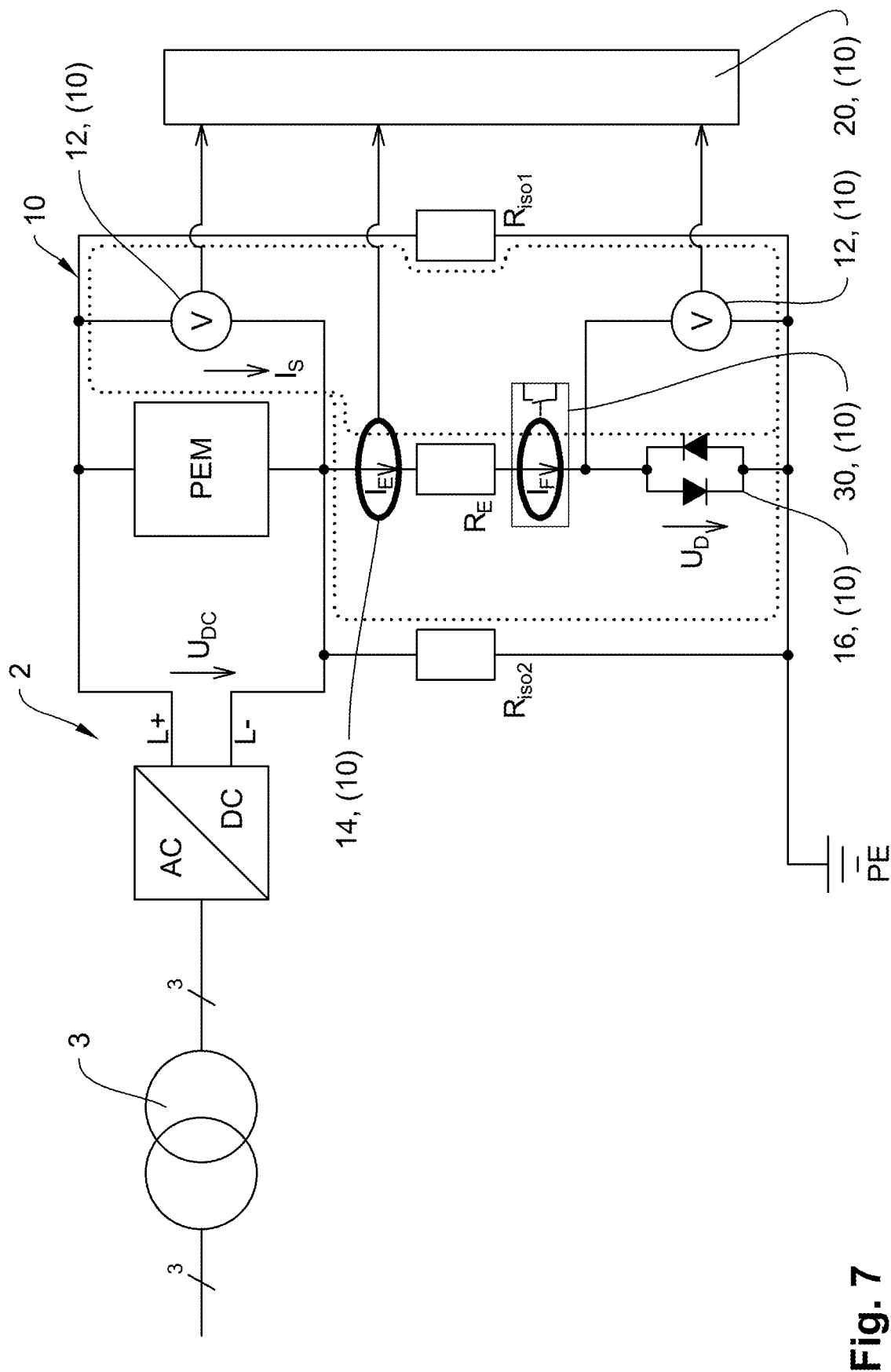
FIG. 7 shows the insulation monitoring arrangement according to FIG. 6 and having a DC residual-current measuring device.

FIG. 7 shows an insulation monitoring according to the invention and FIG. 6 and having a DC residual-current measuring device 30.

In order to effect a quick shutdown of electric installation 2 when a DC residual current $I_F$ flowing in the path of the functional grounding occurs, an additional DC residual-current measuring device 30 is installed in the functional-grounding path.

While DC measuring device 14 is tasked with detecting ground voltage $I_E$ as sensitively as possible using measuring technology during regular operation, additional DC residual-current measuring device 30 is configured for a significantly greater residual current $I_F$ occurring in the event of a fault (ground fault).

Preferably, DC residual-current measuring device 30 is designed as a DC-sensitive modular residual-current device (MRCD).

The invention claimed is:

1. A method for insulation monitoring of an electric installation (2) which is operated using a supply direct voltage ($U_{DC}$) and has a first insulation resistance ($R_{iso1}$) between the positive active conductor (L+) and ground (PE) and a second insulation resistance ($R_{iso2}$) between the negative active conductor (L−) and ground (PE) as well as a functional grounding between the negative active conductor (L−) and ground (PE) by means of a ground resistance ($R_E$), the method comprising the following steps:
   measuring a ground current ($I_E$), which flows in the path of the functional grounding, by means of a DC measuring device (14),
   measuring the supply direct voltage ($U_{DC}$) by means of a voltage measuring device (12),
   computing the first insulation resistance ($R_{iso1}$) from the supply direct voltage ($U_{DC}$) divided by the ground current ($I_E$) by means of a computing unit (20),
   the condition being valid during operation of the electric installation (2) that the second insulation resistance ($R_{iso2}$) is at least 100 times greater than the ground resistance ($R_E$).

2. The method according to claim 1, wherein an antiparallel diode circuit (16) having a bypass switch (18) switched parallel to the antiparallel diode circuit (16) is disposed in series to the ground resistance ($R_E$) in the path of the functional grounding, the bypass switch (18) cyclically alternating between a high-impedance open state and a low-impedance closed state, a diode voltage ($U_D$) being measured by means of another voltage measuring device (12), the first insulation resistance ($R_{iso1}$) being computed in the closed state from the supply direct voltage ($U_{DC}$) divided by the ground current ($I_E$), and the second insulation resistance ($R_{iso2}$) being computed by dividing a diode voltage change ($\Delta U_D$) between the two states and a ground current change ($\Delta I_E$) between the two states by means of the computing unit (20).

3. The method according to claim 1, wherein an antiparallel diode circuit (16) without a bypass switch (18) switched parallel thereto is disposed in series to the ground resistance ($R_E$) in the path of the functional grounding, the first insulation resistance ($R_{iso1}$) being computed from the supply direct voltage ($U_{DC}$) divided by the ground current ($I_E$) by means of the computing unit (20).

4. The method according to claim 1, wherein the ground current ($I_E$) measured by means of the DC measuring device (14) is detected in a range less than 100 mA.

5. The method according to claim 1, wherein a DC residual current ($I_F$) is detected by means of DC residual-current measuring device (30) installed in the path of the functional grounding.

6. The method according to claim 5, wherein the DC residual current ($I_F$) is detected by means of a DC residual-current measuring device (30) configured as a modular residual current device.

7. An application of the method for insulation monitoring according to claim 1, wherein the electric installation (2) operated using the supply direct voltage ($U_{DC}$) is a hydrogen electrolysis installation.

8. An insulation monitoring arrangement (10) for an electric installation which is operated using a supply direct voltage ($U_{DC}$) and has a first insulation resistance ($R_{iso1}$) between the positive active conductor (L+) and ground (PE) and a second insulation resistance ($R_{iso2}$) between the negative active conductor (L−) and ground (PE) and a functional grounding between the negative active conductor (L−) and ground (PE) by means of a ground resistance ($R_E$), the insulation monitoring arrangement (10) having a DC measuring device (14) for measuring a ground current ($I_E$) flowing in the path of the functional grounding, a voltage measuring device (12) for measuring the supply direct voltage ($U_{DC}$), a computing unit (20), which is configured for computing the first insulation resistance ($R_{iso1}$) from the supply direct voltage ($U_{DC}$) divided by the ground current ($I_E$), the condition being valid during operation of the electric installation (2) that the second insulation resistance ($R_{iso2}$) is at least 100 times greater than the ground resistance ($R_E$).

9. The insulation monitoring arrangement (10) according to claim 8, wherein an antiparallel diode circuit (16) having a bypass switch (18) switched parallel to the antiparallel diode circuit (16) is disposed in series to the ground resistance ($R_E$) in the path of the functional grounding, the bypass switch (18) cyclically alternating between a high-impedance open state and a low-impedance closed state, the computing unit (20) being configured for computing the first insulation resistance ($R_{iso1}$) from the supply direct voltage ($U_{DC}$) divided by the ground current ($I_E$) in the closed state and for computing the second insulation resistance ($R_{iso2}$) by dividing the voltage change ($\Delta U_D$) between the two states and the current change ($\Delta I_D$) between the two states.

10. The insulation monitoring arrangement (10) according to claim 8, wherein an antiparallel diode circuit (16) is disposed in series to the ground resistance ($R_E$) in the path of the functional grounding, the computing unit (20) being configured for computing the first insulation resistance ($R_{iso1}$) from the supply direct voltage ($U_{DC}$) divided by the ground current ($I_E$).

11. The insulation monitoring arrangement (10) according to claim 8, wherein the DC measuring device (14) is designed to be highly sensitive for detecting the ground current ($I_E$) in the range of less than 100 mA.

12. The insulation monitoring arrangement (10) according to claim 8, further including a DC residual-current measuring device (30) installed in the path of the functional grounding and configured for detecting a DC residual current ($I_F$).

13. The insulation monitoring arrangement (10) according to claim 12, wherein the DC residual-current measuring device is configured as a modular residual current device.

14. A usage of the insulation monitoring arrangement (10) according to claim 8, wherein the electric installation (2) is a hydrogen electrolysis installation.

* * * * *